US012587287B2

(12) United States Patent
Huang et al.

(10) Patent No.: US 12,587,287 B2
(45) Date of Patent: Mar. 24, 2026

(54) OPTICAL TRANSMISSION SYSTEM TO TRANSMIT SIGNALS BY OPTOELECTRONIC CO-PACKAGED MODULES

(71) Applicant: SHENZHEN AFALIGHT CO., LTD., Shenzhen (CN)

(72) Inventors: Junbin Huang, Shenzhen (CN); Quanfei Fu, Shenzhen (CN); Yong Yang, Shenzhen (CN)

(73) Assignee: SHENZHEN AFALIGHT CO., LTD., Shenzhen (CN)

( * ) Notice: Subject to any disclaimer, the term of this patent is extended or adjusted under 35 U.S.C. 154(b) by 364 days.

(21) Appl. No.: 18/528,802

(22) Filed: Dec. 5, 2023

(65) Prior Publication Data

US 2025/0007622 A1     Jan. 2, 2025

(30) Foreign Application Priority Data

Jun. 28, 2023    (CN) .......................... 202310770424.5

(51) Int. Cl.
 *H04B 10/80* (2013.01)
 *H04B 10/25* (2013.01)
(52) U.S. Cl.
 CPC ........... *H04B 10/801* (2013.01); *H04B 10/25* (2013.01)

(58) Field of Classification Search
None
See application file for complete search history.

(56) References Cited

U.S. PATENT DOCUMENTS

| | | | | |
|---|---|---|---|---|
| 4,707,061 A | * | 11/1987 | McMahon ........... | G02B 6/4246 |
| | | | | 372/18 |
| 6,878,925 B2 | * | 4/2005 | Yamada ............... | G02B 6/2808 |
| | | | | 385/14 |
| 11,271,652 B2 | * | 3/2022 | Yang ................ | H04B 10/25756 |
| 2013/0089332 A1 | * | 4/2013 | Sauer .................. | H04J 14/0278 |
| | | | | 398/72 |

* cited by examiner

*Primary Examiner* — Jai M Lee
(74) *Attorney, Agent, or Firm* — Che-Yang Chen

(57) ABSTRACT

The present invention relates to an optical transmission system to transmit signals by optoelectronic co-packaged modules, comprising a fiber optic transmission bus, several optoelectronic co-packaged modules and several node terminals, wherein optoelectronic co-packaged module corresponds to the node terminals one to one, and several signal transmission nodes is provided on the fiber optic transmission bus, and the location of each of the signal transmission nodes is provided with the optoelectronic co-packaged module, and the optoelectronic co-packaged module is connected with the node terminals, and the bus optical signal is transmitted in the fiber optic transmission bus.

10 Claims, 11 Drawing Sheets

FIG.8                                    FIG.9

OPTICAL TRANSMISSION SYSTEM TO TRANSMIT SIGNALS BY OPTOELECTRONIC CO-PACKAGED MODULES

BACKGROUND OF THE PRESENT INVENTION

Field of Invention

The present invention relates to an optical transmission system, particular to an optical transmission system with several optoelectronic co-packaged modules connected in the optical transmission system.

Description of Related Arts

As we all know, optical transmission is a technology that transmits in the form of optical signals between the sender and the receiver, which mainly has the advantages of long transmission distance, high transmission efficiency, high transmission quality, strong anti-interference ability, and large transmission capacity.

As shown in FIG. 1, in the prior art, the connections between the central control device 1 and the terminal device 2 and between the terminal device 2 and the terminal device 2 are generally by means of an electrical signal transmission wire 3, and when working, the electrical signal transmission wire 3 is connected to each device for electrical signal transmission, wherein, in practice, the electrical signal transmission wire 3 is made of metal wires, such as copper wires. However, the above signal transmission method is used to apply to the industrial products appearing at present, by which the specific application effects are all very unsatisfactory, which are described as follows.

In the field of new energy electric vehicles, the most important component of electric vehicles is the battery pack, and the battery pack consists of several batteries 4a. In order to simultaneously monitor the voltage and current of each battery, as well as the physicochemical state of each battery, it needs to be configured with a battery management system (BMS), and similarly, in order to obtain the maximum efficiency from the battery pack, it should fully charge and discharge to all the batteries at the same time at the same voltage, which also requires the participation of the battery management system.

As shown in FIG. 2, a schematic diagram of the battery management system is illustrated. The battery management system mainly comprises a general controller 1a and several battery monitoring modules 2a, wherein the battery monitoring modules 2a correspond to the batteries 4a one by one, and a large number of signal transmitting wires 3a are connected between the general controller 1a and several battery monitoring modules 2a, and the signal transmitting wires 3a are used to perform a time-to-time telecommunication between the general controller 1a and the battery monitoring modules 2a. Since the signal transmission wires 3a are generally made of copper wires, a large number of shielding structures need to be set up around the signal transmission wires 3a in order to isolate the electromagnetic interference, but a large number of shielding structures are set up, which leads to two main problems. First, it increases the weight of the battery management system, which significantly increases the weight of the vehicle and increases the power consumption of the electric vehicle in driving. Second, since the signal transmission wire 3a and the shielding structure are mostly made of metallic copper, the material cost of the overall product are greatly increased.

As shown in FIG. 3, in the field of intelligent robotics, taking a palm of an intelligent robot as an example, in order to obtain a flexible palm, the palm of an intelligent robot needs to be modeled after the palm of the human body, which is divided into five fingers, and each of fingers has several finger joints 4b. In order to control each of the finger joints 4b and to monitor the working state of each of the finger joints 4b, each of the finger joints 4b needs to be connected to the monitoring module 2b. In practice, in order to coordinate the overall action of each finger joint 4b, it is necessary to connect each monitoring module 2b to the palm controller 1b by the signal wire 3b, and because the signal wire 3b is generally made of copper wire, when a large number of signal wires 3b are all set up in the palm position of the intelligent robot, it will greatly increase the overall weight of the palm. With a view to the overall intelligent robot, it needs to be composed of tens of thousands of node devices, implemented in accordance with the signal transmission method described above. Due to the need to set up a large number of signal wires 3b, the overall weight of the intelligent robot generally need to be increased by several times, as well as it substantially increases the manufacturing cost of the robot.

As shown in FIG. 4, in order to overcome the above mentioned drawbacks, a method of signal transmission using optical fibers to replace signal wires is currently selected in some fields, which is set up as follows: several terminal node devices 2c are connected to a bus optical fiber 1c at the same time, and a light receiver and a light transmitter are arranged in each of the terminal node devices 2c, wherein the light transmitter is connected to an optical coupling device of the bus optical fiber 1c, and the light receiver is connected to an optical branching device of the bus optical fiber 1c, so as to enable several terminal node devices 2c to communicate with the bus optical fiber 1c.

The above signal transmission method can achieve the replacement of traditional signal wires by optical fibers, and can achieve the role of weight reduction and isolation of electromagnetic interference, but in the specific application, the signal transmission effect is not good enough, as to common sense in the field of optoelectronics, the optical coupling device and the optical branching device are both optical devices, and the above method can achieve the mutual transmission of optical signals theoretically, but in the actual application of the process, it cannot be implemented. Because there is optical power attenuation by every time when passing through a level of the optical coupling device or optical branching device, after the optical signal is excessively attenuated, the terminal node device 2c at the far end will be often no longer able to receive the optical signal in the bus optical fiber 1c, which affects the use of the optical signal. As mentioned above, this is a major drawback of the prior art.

SUMMARY OF THE PRESENT INVENTION

The present invention provides an optical transmission system to transmit signals by optoelectronic co-packaged modules, which utilizes the fiber optic transmission bus 10 to replace an electrical signal transmission wire between node terminals in the prior art, so as to transmit data and information in the form of optical signals with the advantages of high transmission efficiency, high transmission quality, high anti-interference capability, and large transmission capacity, which is the main purpose of the present invention.

The present invention provides an optical transmission system to transmit signals by optoelectronic co-packaged modules, which utilizes the fiber optic transmission bus 10 to replace the electrical signal transmission wires between node terminal devices in the prior art, so as to, when transmit data information in the form of optical signals, be capable of greatly reducing the physical weight of the signal transmission portion, and at the same time to be capable of avoiding electromagnetic interference, and to be capable of eliminating all electromagnetic shielding in the information transmission portion of the prior art structure, which is for another purpose of the present invention.

The present invention provides an optical transmission system to transmit signals by optoelectronic co-packaged modules, which utilizes the optoelectronic co-packaged module 100 for converting, copying, and superposing optoelectronic signals between the fiber optic transmission bus 10 and the node terminals 20 to avoid the attenuation of the optical signals in the fiber optic transmission bus 10, which is a further object of the present invention.

According to the present invention, the foregoing and other objects and advantages are attained by providing an optical transmission system to transmit signals by optoelectronic co-packaged modules, comprising a fiber optic transmission bus, several optoelectronic co-packaged modules, and several node terminals, wherein the optoelectronic co-packaged module corresponds to the node terminals one to one, and several signal transmission nodes are provided on the fiber optic transmission bus, and the optoelectronic co-packaged module is provided at the location of each of the signal transmission nodes, and the optoelectronic co-packaged module is connected to the node terminals.

wherein a bus optical signal is transmitted in the fiber optic transmission bus, and the bus optical signal comprises an upstream optical signal and a downstream optical signal.

wherein the upstream optical signal is signaled according to the following steps as the upstream optical signal passes through each of the signal transmission nodes:

step A1, transmitting the upstream optical signal into the optoelectronic co-packaged module.

step B1, the optoelectronic co-packaged module converting the upstream optical signal into an upstream current signal.

step C1, the optoelectronic co-packaged module converting the upstream current signal into a voltage signal and amplifying the voltage signal to obtain an internal upstream voltage signal.

step D1, the optoelectronic co-packaged module replicating the internal upstream voltage signal to obtain a transmission voltage signal and a replication voltage signal, wherein the information of the transmission voltage signal and the replication voltage signal are the same as the information of the upstream optical signal.

step E1, transmitting the replication voltage signal into the node terminal, and the optoelectronic co-packaged module converting the transmission voltage signal into an upstream output current signal.

step F1, the optoelectronic co-packaged module converting the upstream output current signal into the upstream optical signal.

step G1, the optoelectronic co-packaged module transmitting the upstream optical signal into the fiber optic transmission bus so that the upstream optical signal continues to be transmitted forward along the fiber optic transmission bus.

wherein the downstream optical signal passes through each of the signal transmission nodes in accordance with the following steps of signal transmission:

step A2, transmitting the downstream optical signal to the optoelectronic co-packaged module.

step B2, the optoelectronic co-packaged module converting the downstream optical signal into a downstream current signal.

step C2, the optoelectronic co-packaged module converting the downstream current signal into a voltage signal and amplifies the voltage signal to obtain a downstream voltage signal.

step D2, transmitting the feedback voltage signal generated from the feedback information of the node terminal to the optoelectronic co-packaged module, and the optoelectronic co-packaged module superposing the downstream voltage signal with the feedback voltage signal to form the superposed voltage signal.

step E2: the optoelectronic co-packaged module converting the superposed voltage signal into a downstream output current signal.

step F2, the optoelectronic co-packaged module converting the downstream output current signal into a superposed downstream optical signal, wherein the information of the superposed downstream optical signal comprises the information of the downstream optical signal and the feedback information of the node terminal.

step G2, the optoelectronic co-packaged module transmitting the superposed downstream optical signal into the fiber optic transmission bus.

step H2, transmitting the superposed downstream optical signal used as the downstream optical signal of another optoelectronic co-packaged module into another optoelectronic co-packaged module, and repeating the step A2.

These and other objectives, features, and advantages of the present invention will become apparent from the following detailed description, the accompanying drawings, and the appended claims.

BRIEF DESCRIPTION OF THE DRAWINGS

FIG. 8 is a schematic diagram of a Y-type silicon base in the electrical signal replication module of the present invention.

FIG. 9 is a schematic diagram of a Y-type silicon base in an electrical signal superposition module of the present invention.

DETAILED DESCRIPTION OF THE PREFERRED EMBODIMENT

As shown in FIGS. 5 to 20, an optical transmission system to transmit signals by optoelectronic co-packaged modules comprises a fiber optic transmission bus 10, several optoelectronic co-packaged modules 100, and several node terminals 20.

Figure 1:
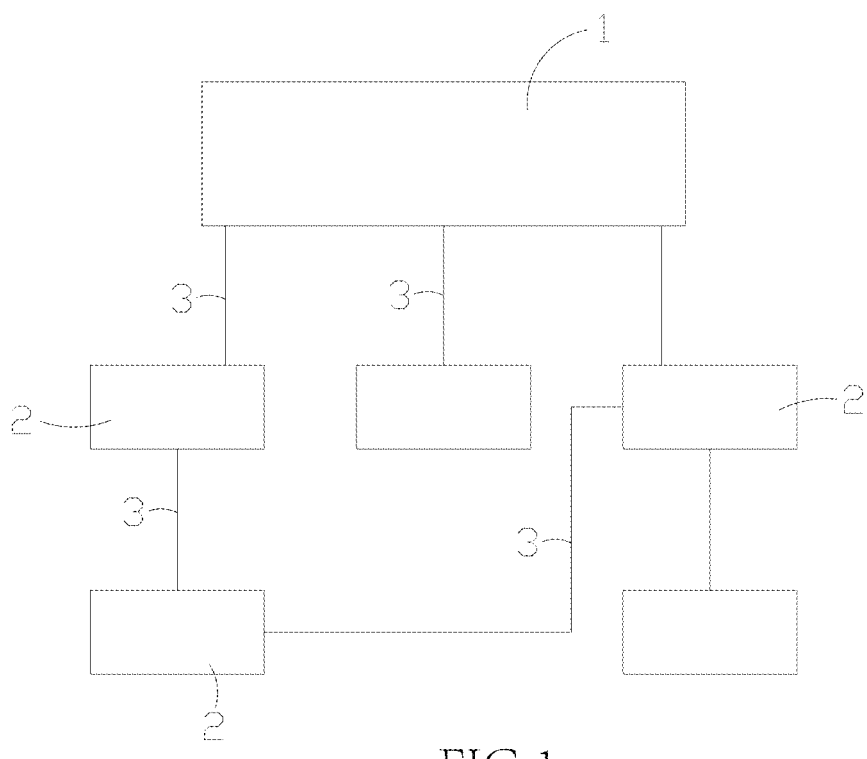
FIG. 1 is a schematic diagram of transmitting a signal by an electrical signal transmission wire in the prior art.
Figure 2:
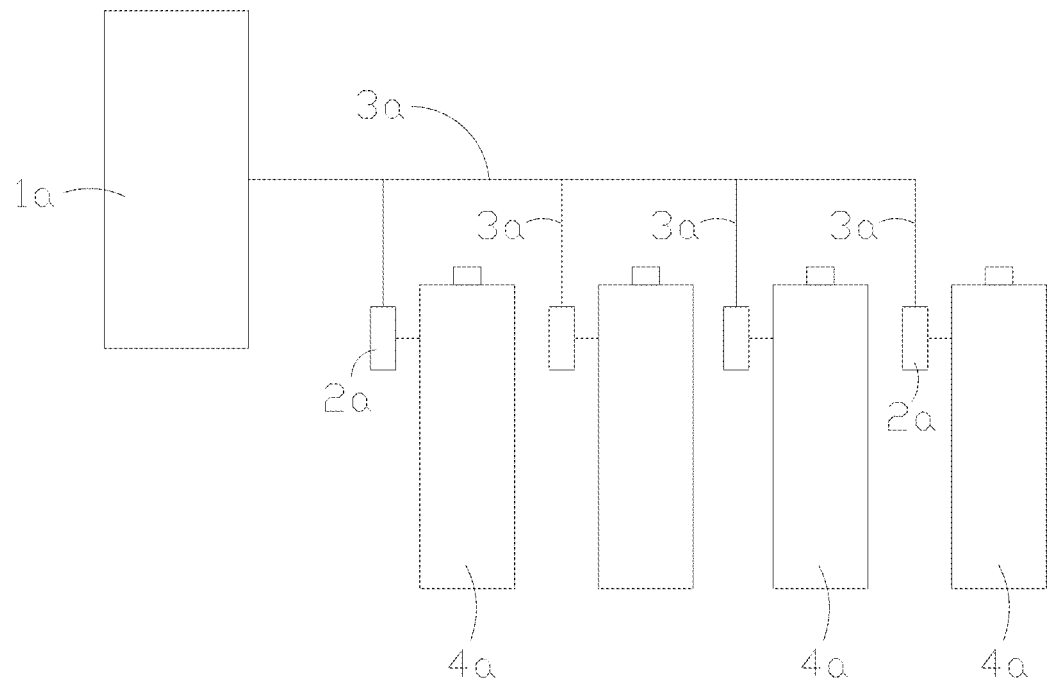
FIG. 2 is a schematic diagram of transmitting a signal by a signal transmission wire in a new energy electric vehicle in the prior art.
Figure 3:
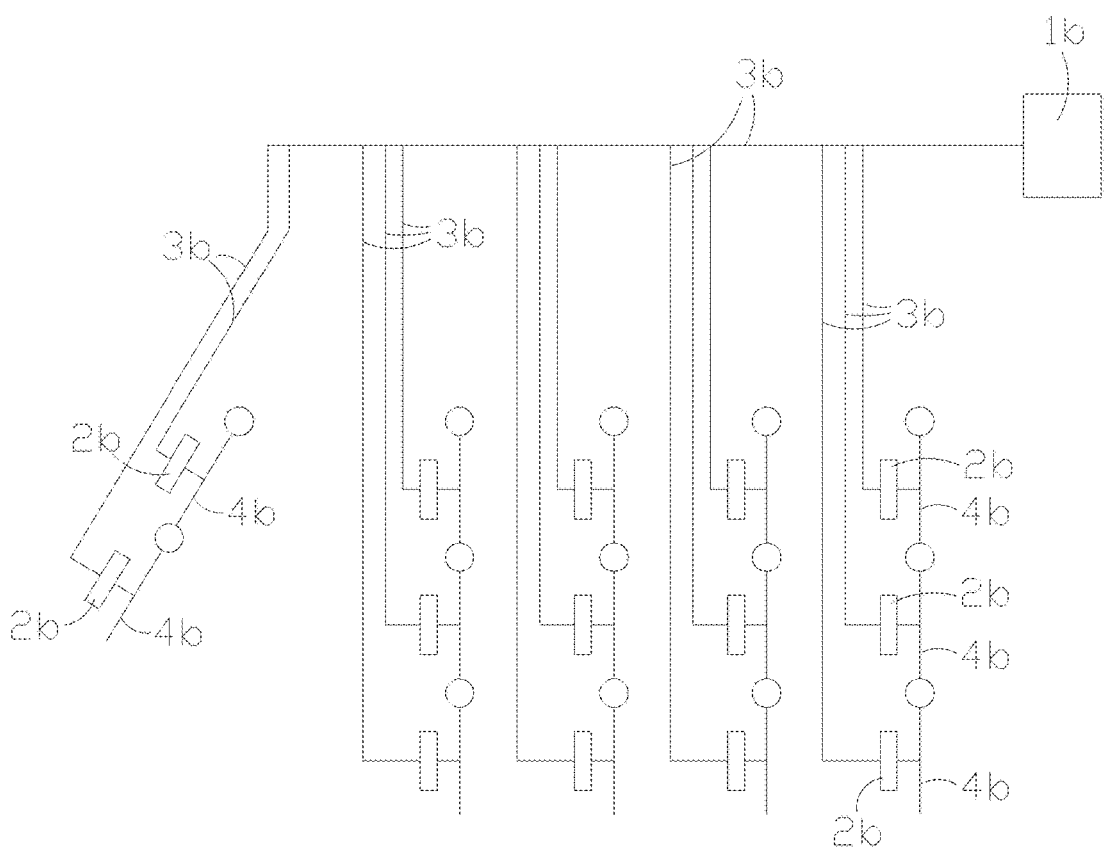
FIG. 3 is a schematic diagram of transmitting signals by signal wires in an intelligent robot hand in the prior art.
Figure 4:
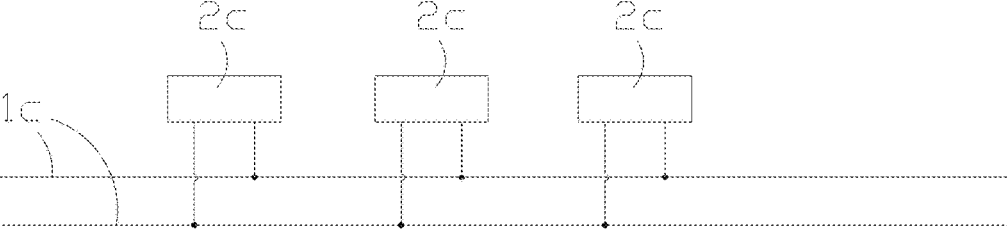
FIG. 4 is a schematic diagram of signal transmission by optical fiber in the prior art.
Figure 5:
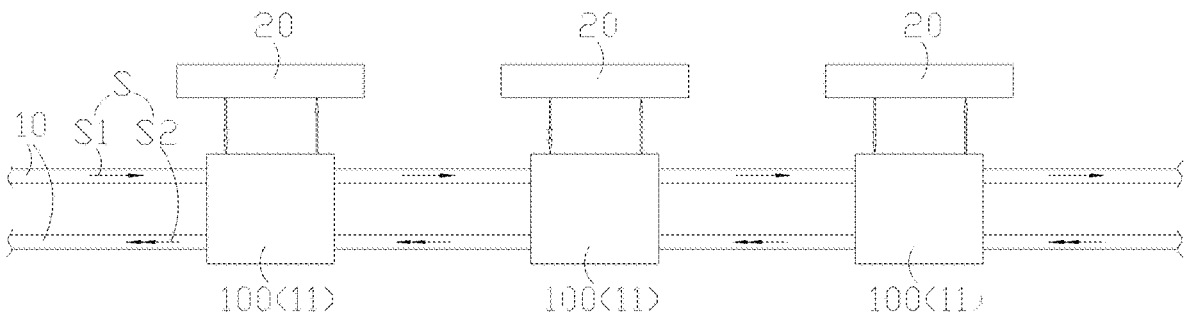
FIG. 5 is a schematic diagram of the connection of the optoelectronic signal switching module of the present invention.

As shown in FIG. 5, the optoelectronic co-packaged module 100 corresponds to the node terminals 20 one to one, and several signal transmission nodes 11 are provided on the fiber optic transmission bus 10, and the optoelectronic co-packaged module 100 is provided at the location of each of the signal transmission nodes 11, and the optoelectronic co-packaged module 100 is connected to the node terminals 20.

A bus optical signal S is transmitted in the fiber optic transmission bus 10, and the bus optical signal S comprises an upstream optical signal S1 and a downstream optical signal S2.

The optoelectronic co-packaged module 100 is used to perform converting the optical signals and the electrical signals between, and in embodiment, the optoelectronic co-packaged module 100 is formed by co-packaging the optical signal processor member and the electrical signal processor member together.

Figure 6:
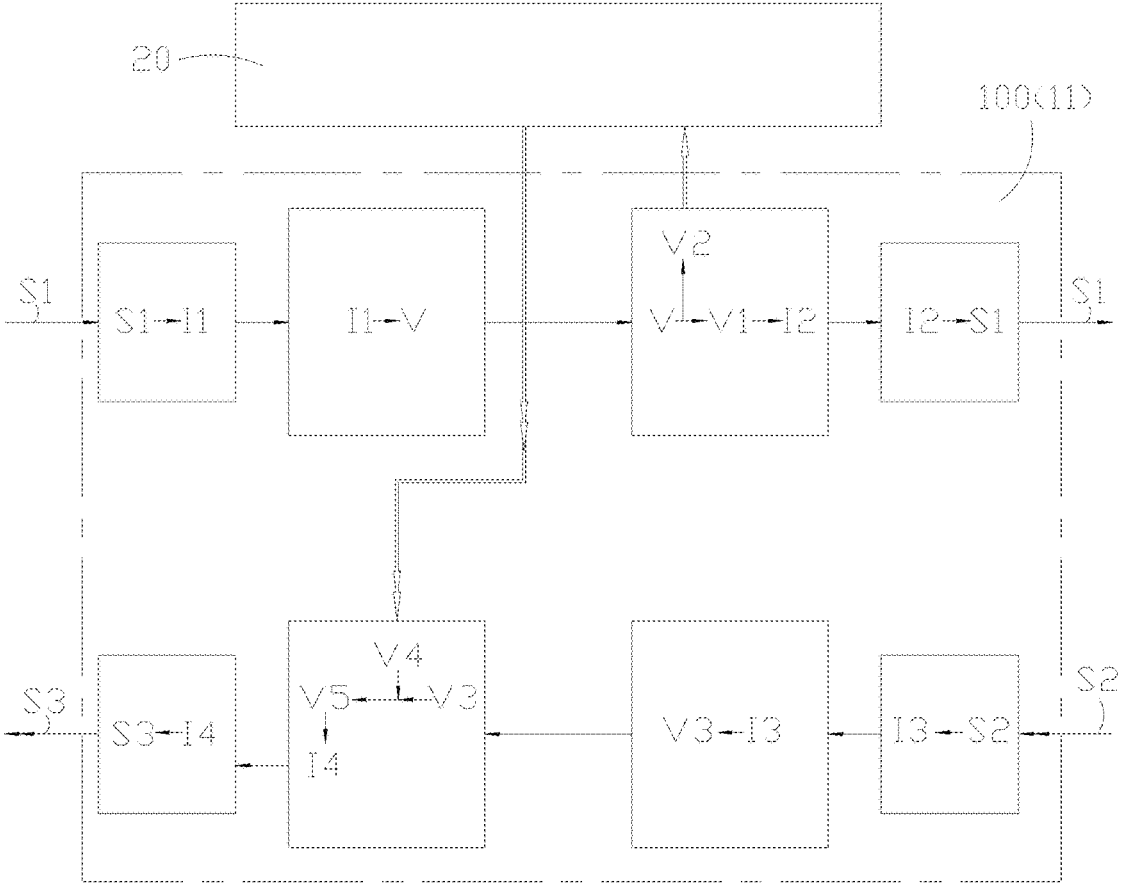
FIG. 6 is a theoretical schematic diagram of the optoelectronic signal switching module of the present invention.

As shown in FIGS. 5 and 6, the upstream optical signal S1 is signaled according to the following steps as the upstream optical signal S1 passes through each of the signal transmission nodes 11.

Step A1, transmitting the upstream optical signal S1 into the optoelectronic co-packaged module 100.

Step B1, the optoelectronic co-packaged module 100 converting the upstream optical signal S1 into an upstream current signal I1, wherein signal I1 is between 0.1 mA and 1.2 mA.

Step C1, the optoelectronic co-packaged module 100 converting the upstream current signal I1 into a voltage signal, and amplifying the voltage signal to obtain an internal upstream voltage signal V, wherein the internal upstream voltage signal V is between 200 and 800 mV.

Step D1, the optoelectronic co-packaged module 100 replicating the internal upstream voltage signal V to obtain a transmission voltage signal V1 and a replication voltage signal V2, wherein the transmission voltage signal V1 and the replication voltage signal V2 are between 100 and 400 mV, and the information of the transmission voltage signal V1 and the replication voltage signal V2 are the same as the information of the upstream optical signal S1.

Step E1, transmitting the replication voltage signal V2 into the node terminal 20, and the optoelectronic co-packaged module 100 converting the transmission voltage signal V1 into an upstream output current signal I2, wherein the upstream output current signal I2 is between 5 and 20 mA.

Step F1, the optoelectronic co-packaged module 100 converting the upstream output current signal I2 into the upstream optical signal S1.

Step G1, the optoelectronic co-packaged module 100 transmitting the upstream optical signal S1 into the fiber optic transmission bus 10 so that the upstream optical signal S1 continues to be transmitted forward along the fiber optic transmission bus 10.

The downstream optical signal S2 passes through each of the signal transmission nodes 11 in accordance with the following steps of signal transmission.

Step A2, transmitting the downstream optical signal S2 to the optoelectronic co-packaged module 100.

Step B2, the optoelectronic co-packaged module 100 converting the downstream optical signal S2 into a downstream current signal I3, wherein the downstream current signal I3 is between 0.1 mA and 1.2 mA.

Step C2, the optoelectronic co-packaged module 100 converting the downstream current signal I3 into a voltage signal and amplifies the voltage signal to obtain a downstream voltage signal V3, wherein the downstream voltage signal V3 is between 100 and 400 mV.

Step D2, transmitting the feedback voltage signal V4 generated from the feedback information of the node terminal 20 to the optoelectronic co-packaged module 100, wherein the feedback voltage signal V4 is between 100 and 400 mV, and the optoelectronic co-packaged module 100 superposing the downstream voltage signal V3 with the feedback voltage signal V4 to form the superposed voltage signal V5, wherein the superposed voltage signal V5 being between 200 and 800 mV.

Step E2, the optoelectronic co-packaged module 100 converting the superposed voltage signal V5 into a downstream output current signal I4, wherein the downstream output current signal I4 is between 5 and 20 mA.

Step F2, the optoelectronic co-packaged module 100 converting the downstream output current signal I4 into a superposed downstream optical signal S3, wherein the information of the superposed downstream optical signal S3 comprises the information of the downstream optical signal S2 and the feedback information of the node terminal 20.

Step G2, the optoelectronic co-packaged module 100 transmitting the superposed downstream optical signal S3 into the fiber optic transmission bus 10.

Step H2, transmitting the superposed downstream optical signal S3 used as the downstream optical signal S2 of another optoelectronic co-packaged module 100 into another optoelectronic co-packaged module 100, and repeating the above step A2, and so on.

Figure 7:
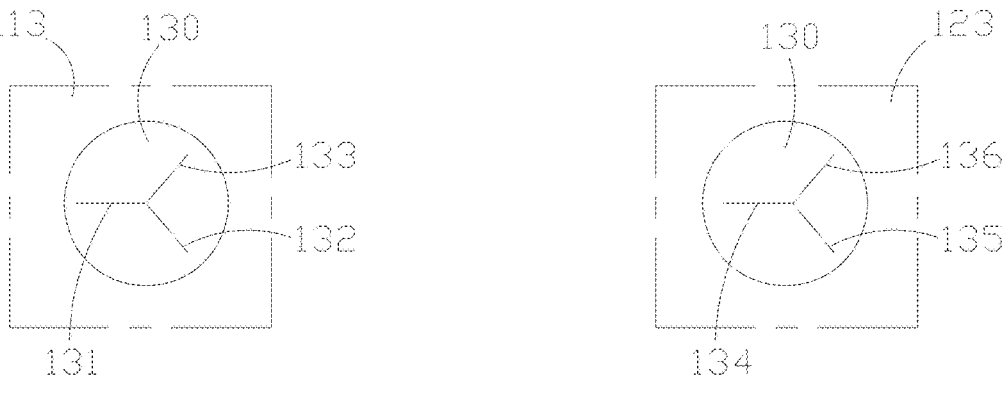
FIG. 7 is a schematic diagram of the internal components of the optoelectronic signal switching module of the present invention.

As shown in FIG. 7, in embodiment, the optoelectronic co-packaged module 100 comprises an upstream signal processing portion 110 and a downstream signal processing portion 120.

In the optoelectronic co-packaged module 100, the upstream optical signal S1 is transmitted by the upstream signal processing portion 110, and in the optoelectronic co-packaged module 100, the downstream optical signal S2 is transmitted by the downstream signal processing portion 120.

The upstream signal processing portion 110 comprises an upstream optical signal receiver 111, an upstream signal conversion amplification module 112, an electrical signal replication module 113, and an upstream optical signal transmitter 114, wherein in the step B1, the upstream optical signal S1 is converted into the upstream current signal I1 by the upstream optical signal receiver 111, wherein in the step C1, the upstream signal conversion amplification module 112 converts the upstream current signal I1 into a voltage signal, and amplifies the voltage signal to obtain the internal upstream voltage signal V, wherein the step D1, the electrical signal replication module 113 replicates the internal upstream voltage signal V to obtain the transmission voltage signal V1 and the replicated voltage signal V2, wherein in the step E1, the electrical signal replication module 113 transmits the replicated voltage signal V2 to the node terminal 20, and the electrical signal replication module 113 converts the transmission voltage signal V1 into the upstream output current signal I2, wherein in the step F1, the upstream optical signal transmitter 114 converts the upstream output current signal I2 into the upstream optical signal S1.

The downstream signal processing portion 120 comprises a downstream optical signal receiver 121, a downstream signal conversion amplification module 122, an electrical signal superposition module 123, and a downstream optical signal transmitter 124.

Wherein in the step B2, the downstream optical signal S2 is converted into the downstream current signal I3 by the downstream optical signal receiver 121, wherein in the step C2, the downstream current signal I3 is converted into a voltage signal by the downstream signal conversion amplification module 122, and the voltage signal is amplified to obtain the downstream voltage signal V3, wherein in the step D2, the feedback voltage signal V4 is transmitted to the electrical signal superposition module 123, and the electrical signal superposition module 123 superposes the downstream voltage signal V3 with the feedback voltage signal V4 to form the superposed voltage signal V5, wherein in the step E2, the electrical signal superposition module 123 converts the superposed voltage signal V5 into the downstream output current signal I4, wherein in the step F2, the downstream optical signal transmitter 124 converts the downstream output current signal I4 into the superposed downstream optical signal S3.

In embodiment, the electrical signal replication module 113 and the electrical signal superposition module 123 can achieve their functions in an active or passive form. In the passive case there are various prior art capable of achieving the functions of both, such as, for example, voltage divider circuits, voltage regulator ICs, LDOs, and the like, and a preferred embodiment is described below.

As shown in FIG. 8, the electrical signal replication module 113 is provided with a Y-type silicon base 130 having a voltage input terminal 131, a first voltage output terminal 132, and a second voltage output terminal 133, wherein the internal upstream voltage signal V is input into the Y-type silicon base 130 from the voltage input terminal 131, and the transmission voltage signal V1 is output from the first voltage output terminal 132, and the electrical signal replication module 113 converts the transmission voltage signal V1 into the upstream output current signal I2, and the replicated voltage signal V2 is output from the second voltage output terminal 133 and transmitted to the node terminal 20.

As shown in FIG. 9, the electrical signal superposition module 123 is provided with a Y-type silicon base 130, which has a voltage output terminal 134, a first voltage input terminal 135, and a second voltage input terminal 136, wherein the downstream voltage signal V3 is input into the Y-type silicon base 130 from the first voltage input terminal 135, and the feedback voltage signal V4 is input into the Y-type silicon base 130 from the second voltage input terminal 136, and the superposed voltage signal V5 is output from the first voltage input terminal 135. In the Y-type silicon base 130, the downstream voltage signal V3 is superposed with the feedback voltage signal V4 to form the superposed voltage signal V5, and the superposed voltage signal V5 is output from the voltage output terminal 134.

The basic theory of the Y-type silicon base 130 is based on the transmission theory of electromagnetic fields, and the silicon in the Y-type silicon base 130 acts as a waveguide to transmit electromagnetic fields and is capable of evenly distributing one way of voltage energy into two ways of voltage energy output, and alternatively, is capable of superposing two ways of voltage energy into one way of voltage energy output, and is capable of reducing reflection loss. The design of the Y-type silicon base 130 is the most power-saving, equivalent to one passive point to divide energy in two. The electrical signal replication module 113 and the electrical signal superposition module 123 require an external power supply in the active case.

A preferred embodiment is described below. The electrical signal replication module 113 and the electrical signal superposition module 123 are set up as operational amplifiers (Op-Amp), and the appropriate model is selected according to the actual signal frequency and power supply requirements. By configuring the operational amplifier as a voltage follower buffer mode, it is possible to achieve the function of both, and the functional theory of the operational amplifier belonging to the prior art will not be repeated here.

In specific implementation, in order to ensure the transmission quality of the bus optical signal S, the bus optical signal S is monitored and corrected. The optical transmission system also comprises an upstream comparison error corrector 210 and a downstream comparison error corrector 220.

Figure 10:
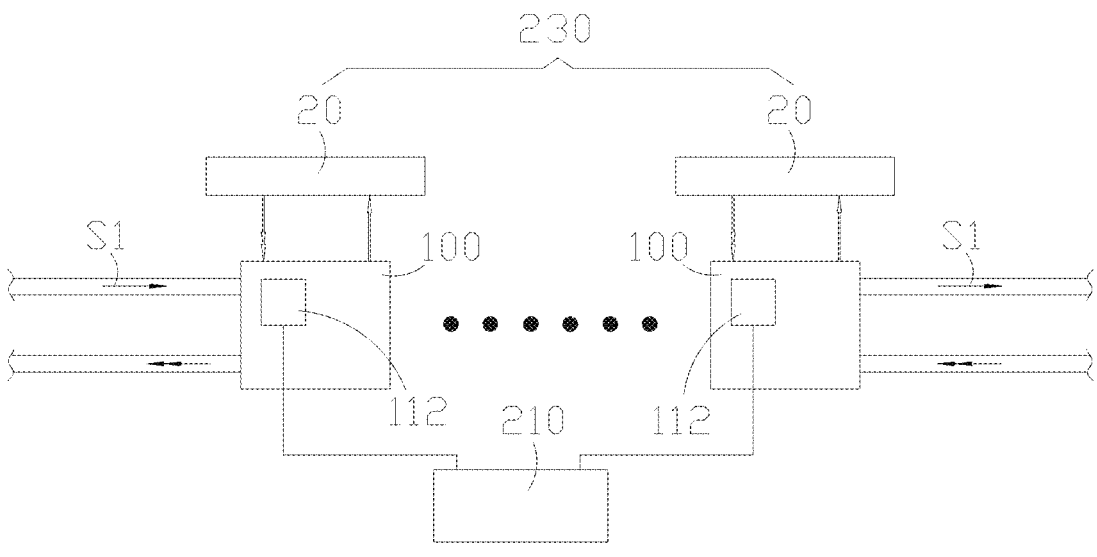
FIG. 10 is a theoretical schematic diagram of an upstream comparison error corrector of the present invention.
Figure 11:
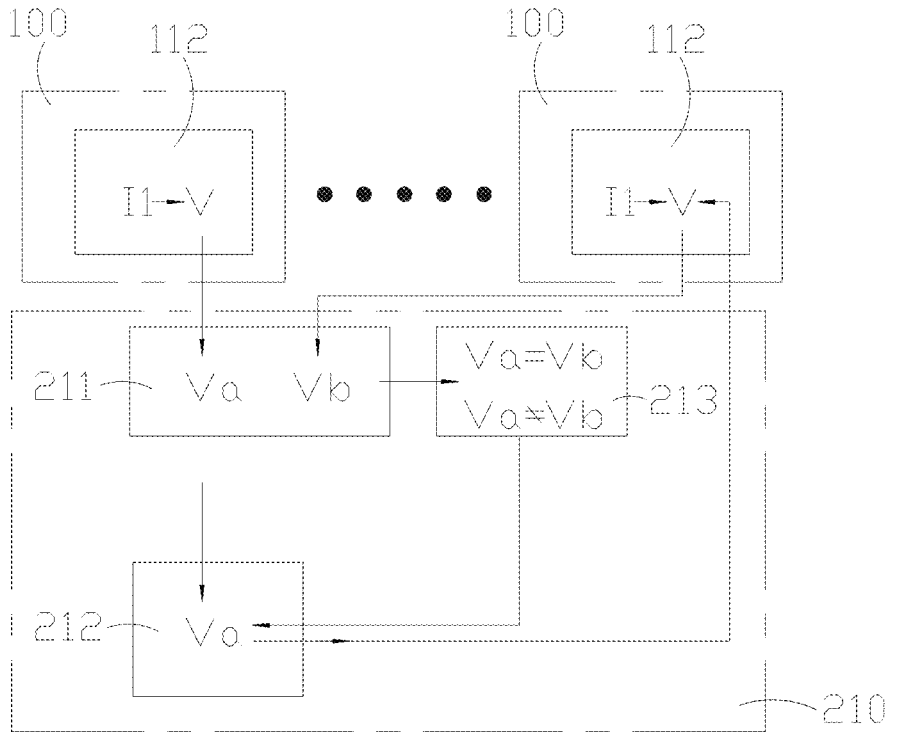
FIG. 11 is a theoretical schematic diagram of operation of the upstream comparison error corrector of the present invention.

As shown in FIGS. 10 and 11, wherein the upstream comparison error corrector 210 is connected to an upstream signal transmission section 230, wherein the upstream signal transmission section 230 is provided with several of the optoelectronic co-packaged modules 100, wherein the upstream comparison error corrector 210 is used to correct the error of the upstream optical signal S1 in the upstream signal transmission section 230.

The upstream comparison error corrector 210 comprises an upstream voltage acquisition module 211, an upstream storage module 212, and an upstream voltage comparison module 213, wherein the upstream voltage acquisition module 211 is connected to the upstream signal conversion amplification modules 112 of the front-most and the rearmost optoelectronic co-packaged module 100 in the upstream signal transmission section 230 respectively.

The upstream voltage acquisition module 211 acquires the internal upstream voltage signal V generated in the upstream signal conversion amplification module 112 in the frontmost optoelectronic co-packaged module 100 and forms the upstream standard voltage signal Va, and in synchronization, the upstream voltage acquisition module 211 acquires the internal upstream voltage signal V generated in the upstream signal conversion amplification module 112 in the rearmost optoelectronic co-packaged module 100 and forms an upstream ratio signal V and forms an upstream comparison voltage signal Vb.

The upstream voltage acquisition module 211 transmits the upstream standard voltage signal Va to the upstream storage module 212 for storage, and at the same time, the upstream voltage acquisition module 211 transmits the upstream standard voltage signal Va and the upstream comparison voltage signal Vb to the upstream voltage comparison module 213 for comparison.

When the upstream standard voltage signal Va is equal to the upstream comparison voltage signal Vb, the upstream comparison error corrector 210 does not operate, and when the upstream standard voltage signal Va is not equal to the upstream comparison voltage signal Vb, the upstream storage module 212 transmits the upstream standard voltage signal Va to the upstream signal conversion amplification module 112 of the last-end optoelectronic co-packaged module 100, and the upstream standard voltage signal Va generates the internal upstream voltage signal V of the last end optoelectronic co-packaged module 100 and continues to be transmitted backward. In embodiment, according to the power of the transmission and the specific requirements, it is capable to choose and determine a specific number of optoelectronic co-packaged modules 100 in the upstream signal transmission section 230, for example, from three to ten, so as to monitor the quality of the transmission of the upstream optical signal S1 and to correct error to ensure the transmission quality.

Figure 12:
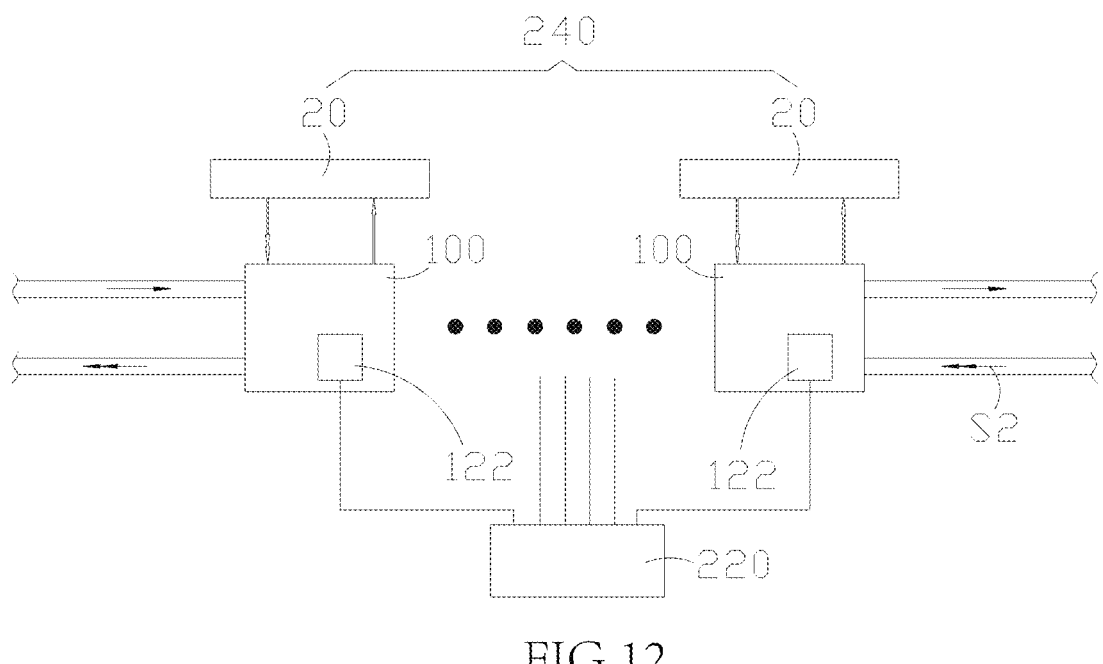
FIG. 12 is a theoretical schematic diagram of the downstream comparison error corrector of the present invention.
Figure 13:
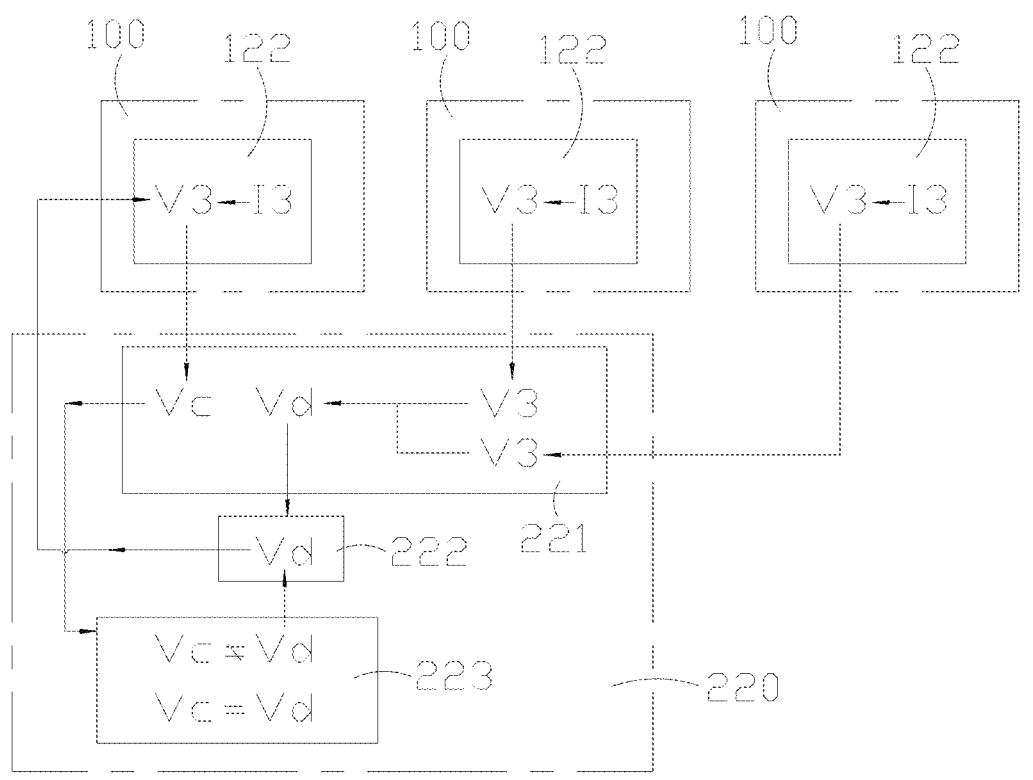
FIG. 13 is a theoretical schematic diagram of operation of the downstream comparison error corrector of the present invention.

As shown in FIGS. 12 and 13, the downstream comparison error corrector 220 is connected to a downstream signal transmission section 240, and the several optoelectronic co-packaged modules 100 are provided in the downstream signal transmission section 240, and the downstream comparison error corrector 220 is used to correct an error of the downstream optical signal S2 in the downstream signal transmission section 240.

The downstream comparison error corrector 220 comprises a downstream voltage acquisition module 221, a downstream storage module 222, and a downstream voltage comparison module 223, wherein the downstream voltage acquisition module 221 is connected to the downstream signal conversion amplification module 122 in each of the optoelectronic co-packaged modules 100 in the downstream signal transmission section 240.

The downstream voltage acquisition module 221 acquires the downstream voltage signal V3 generated in the downstream signal conversion amplification module 122 in the foremost optoelectronic co-packaged module 100 in the downstream signal transmission section 240 and forms the downstream contrast voltage signal Vc, and in synchronization, the downstream voltage acquisition module 221 acquires the downstream voltage signals V3 generated in the downstream signal conversion amplification module 122 in the rest of the optoelectronic co-packaged modules 100 in the downstream signal transmission section 240, and superpose several downstream voltage signals V3 and form a downstream standard voltage signal Vd, and the downstream voltage acquisition module 221 transmits the downstream standard voltage signal Vd to the downstream storage module 222 for storage, and at the same time, the downstream voltage acquisition module 221 transmits the downstream standard voltage signal Vd and the downstream comparison voltage signal Vc to the downstream voltage comparison module 223 for comparison.

When the downstream standard voltage signal Vd is equal to the downstream comparison voltage signal Vc, the downstream comparison error corrector 220 does not operate, and when the downstream standard voltage signal Vd is not equal to the downstream comparison voltage signal Vc, the downstream storage module 222 transmits the downstream standard voltage signal Vd to the downstream signal conversion amplification module 122 of the foremost optoelectronic co-packaged module 100, and the standard voltage signal Vd generates a downstream voltage signal V3 of the foremost optoelectronic co-packaged module 100 and continues to be transmitted forward.

In embodiment, the downstream comparison error corrector 220 can be arranged pertinently, and when there is a key node device in the downstream signal transmission section 240, the monitoring of the key node device can be achieved by the downstream comparison error corrector 220, and in embodiment, the several optoelectronic co-packaged modules 100 in the downstream signal transmission section 240 is generally no more than five.

In embodiment, in order to facilitate the connection and assembly of the optoelectronic co-packaged module 100, the optoelectronic co-packaged module 100 can be set up in various forms, and some preferred embodiments are described below.

Figure 14:
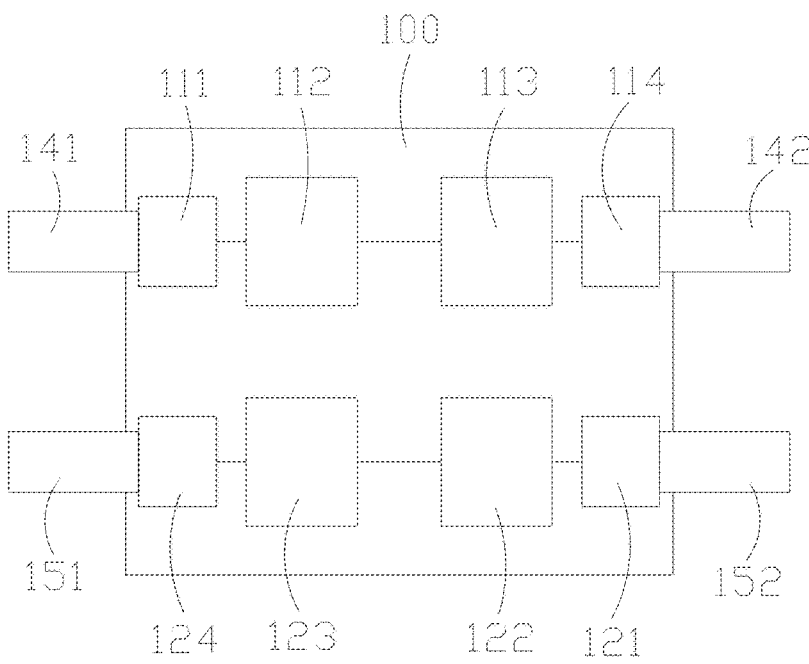
FIG. 14 is a schematic diagram of an optoelectronic signal switching module in first embodiment of the present invention.

As shown in FIG. 14, embodiment I, the optoelectronic co-packaged module 100 comprises a first upstream optical port tube 141 and a second upstream optical port tube 142, wherein the first upstream optical port tube 141 and the second upstream optical port tube 142 are connected to both sides of the optoelectronic co-packaged module 100, and optical fibers for transmitting the upstream optical signal S1 are provided in the first upstream optical port tube 141 and the second upstream optical port tube 142 respectively. The optoelectronic co-packaged module 100 comprises a first downstream optical port 151 and a second downstream optical port 152, wherein the first downstream optical port 151 and the second downstream optical port 152 are connected to both sides of the optoelectronic co-packaged module 100, and optical fibers for transmitting the downstream optical signals S2 are set in the first downstream optical port 151 and the second downstream optical port 152 respectively. The optoelectronic co-packaged module 100 has a substrate, wherein each device of the upstream signal processing section 110 and the downstream signal processing section 120 is uniformly provided on the substrate.

Figure 15:
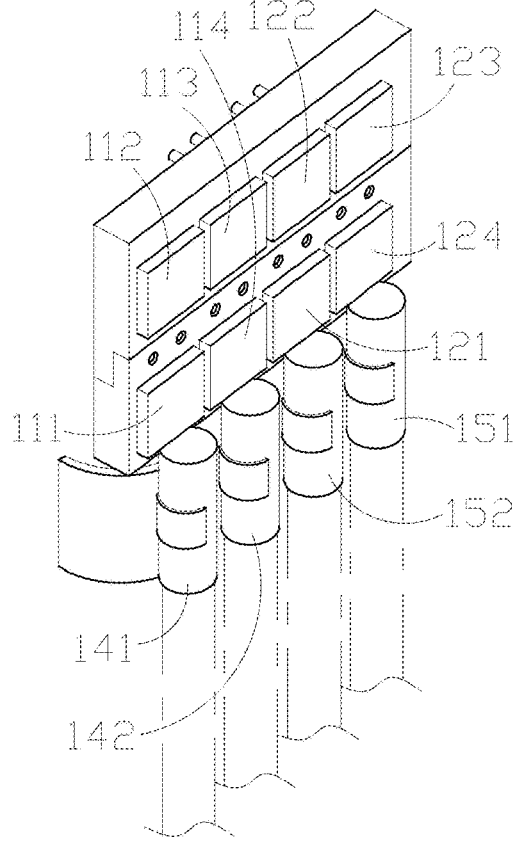
FIG. 15 is a view of the optoelectronic signal switching module in second embodiment of the present invention.
Figure 16:
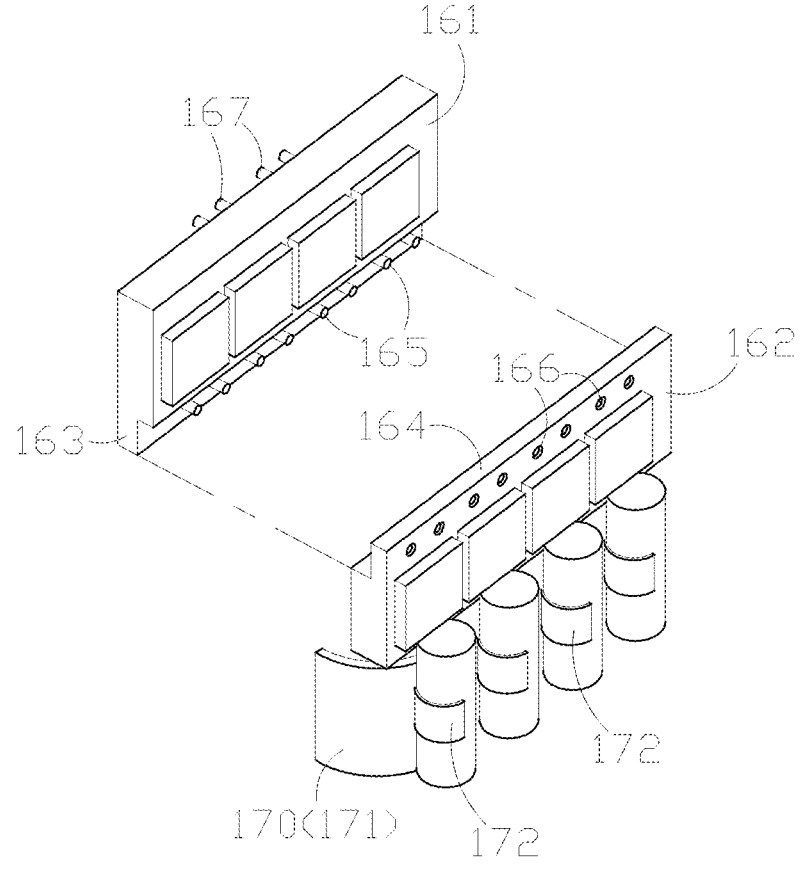
FIG. 16 is a view of the optoelectronic signal switching module in second embodiment of the present invention.
Figure 17:
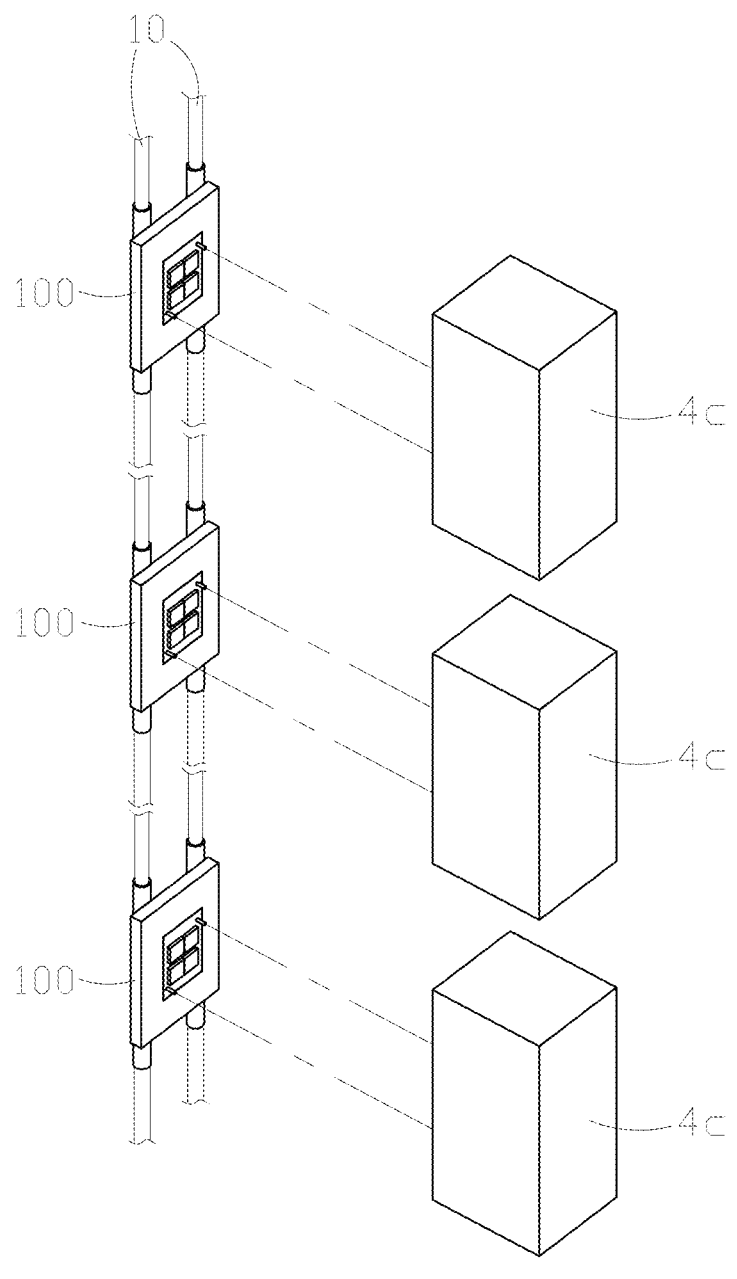
FIG. 17 is a view of the connection of the optoelectronic signal switching module in third embodiment of the present invention.
Figure 18:
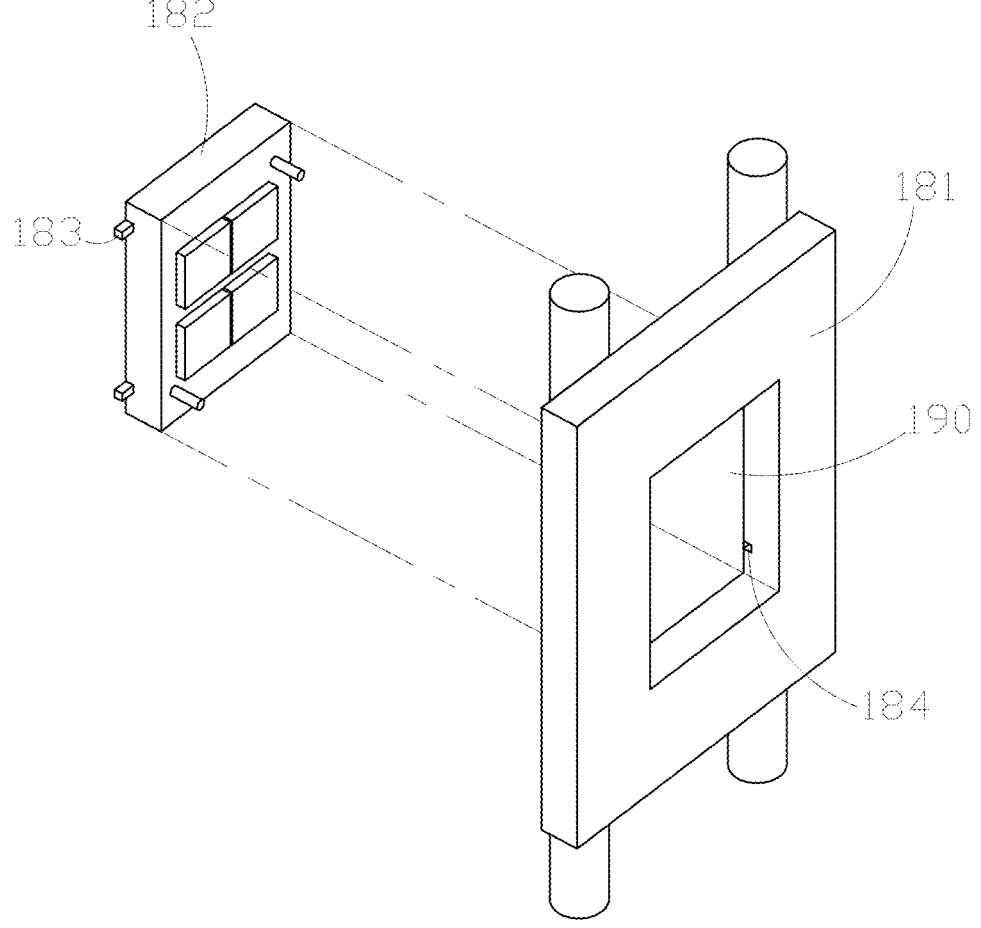
FIG. 18 is a view of the decomposition of the optoelectronic signal switching module in third embodiment of the present invention.
Figure 19:
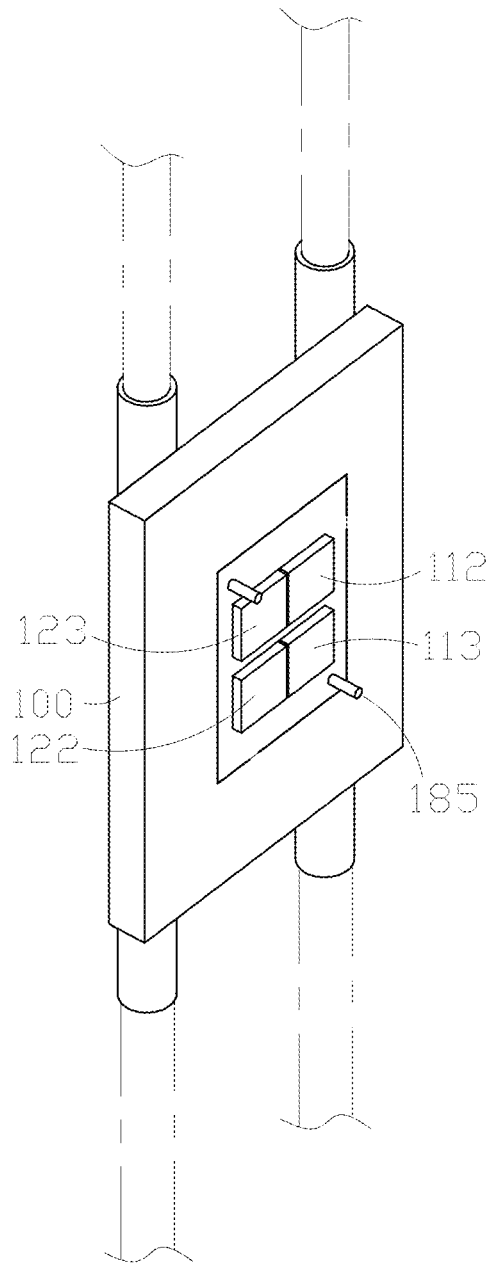
FIG. 19 is a perspective view of the optoelectronic signal switching module in third embodiment of the present invention.
Figure 20:
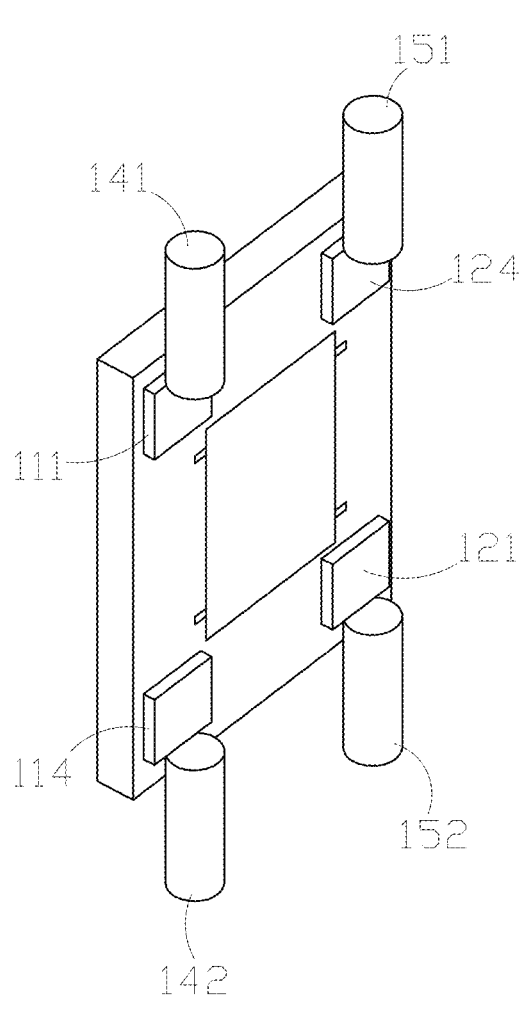
FIG. 20 is another perspective view of the optoelectronic signal switching module in third embodiment of the present invention.

As shown in FIGS. 15 to 16, in embodiment II, in a battery management system in the field of a new energy electric vehicle, the optoelectronic co-packaged module 100 for monitoring each battery 4a can be configured as follows.

The optoelectronic co-packaged module 100 comprises an upper integrated board 161 and a lower integrated board 162, wherein the upper integrated board 161 is connected to the top of the lower integrated board 162, and the upper integrated board 161 and the lower integrated board 162 are parallel to each other. The upstream signal conversion amplification module 112, the electrical signal copying module 113, the downstream signal conversion amplification module 122, and the electrical signal superposition module 123 are arranged on the upper integrated board 161. The upstream optical signal receiver 111, the upstream optical signal transmitter 114, the downstream optical signal receiver 121, and the downstream optical signal transmitter 124 are arranged on the lower integration board 162.

The optoelectronic co-packaged module 100 further comprises a first upstream optical port tube 141, a second upstream optical port tube 142, a first downstream optical port tube 151, and a second downstream optical port tube 152.

The first upstream optical port tube 141, the second upstream optical port tube 142, the first downstream optical port tube 151, and the second downstream optical port tube 152 are arranged at the bottom of the lower integrated board 162.

The first upstream optical port tube 141, the second upstream optical port tube 142, the first downstream optical port tube 151, and the second downstream optical port tube 152 are arranged in parallel with each other, wherein optical fibers for transmitting the upstream optical signal S1 are arranged in the first upstream optical port tube 141 and the second upstream optical port tube 142 respectively, and optical fibers for transmitting the downstream optical signal S2 are arranged in the first downstream optical port tube 151 and the second downstream optical port tube 152 respectively.

The first upstream optical port tube 141 is connected to the upstream optical signal receiver 111, and the second upstream optical port tube 142 is connected to the upstream optical signal transmitter 114, and the first downstream optical port tube 151 is connected to the downstream optical signal transmitter 124, and the second downstream optical port tube 152 is connected to the downstream optical signal receiver 121.

The optoelectronic co-packaged module 100 further comprises an integrated retainer 170, wherein the integrated retainer 170 comprises a battery retaining claw 171 and several optical port tube retaining claws 172, wherein several optical port tube retaining claws 172 are simultaneously connected to the battery retaining claw 171, and the battery retaining claw 171 is snapped to the battery 4a. The first upstream optical port tube 141, the second upstream optical port tube 142, the first downstream optical port tube 151, and the second downstream optical port tube 152 are correspondingly snapped in the optical port tube retaining jaws 172.

In embodiment, the upper integrated board 161 is provided with a male engaging plate 163 below, and the lower integrated board 162 is provided with the female engaging plate 164 corresponding to the male engaging plate 163, wherein the male engaging plate 163 is provided with several male pins 165 in parallel, and several female pin holes 166 is provided with the female engaging plate 164 corresponding to the several male pins 165, and the several male pins 165 are correspondingly inserted in the several female pin holes 166 so as to achieve the connection between the upper integrated board 161 and the lower integrated board 162, to achieve the connection between the upstream optical signal receiver 111 and the upstream signal converter-amplifier module 112, to achieve the connection between the electrical signal superposition module 113 and the upstream optical signal transmitter 114, to achieve the connection between the downstream optical signal receiver 121 and the downstream signal converter-amplifier module 122 of the downstream optical signal receiver 121, and to achieve the connection between the electrical signal superposition module 123 and the downstream optical signal transmitter 124. The upper integrated board 161 is also provided with several module pins 167 at the back thereof, wherein the several module pins 167 are connected to the electrical signal replication module 113 and the electrical signal superposition module 123 respectively, and the several module pins 167 are plugged into the node terminal 20 to achieve the fixed connection and electrical connection between the optoelectronic co-packaged module 100 and the node terminal 20.

As shown in FIGS. 17 to 20, embodiment III, for a specific application in the field of intelligent robotics, the intelligent robot consists of several action joints 4c, for example, the index finger of the intelligent robot consists of three action joints 4c, wherein in order to monitor the state of each of the action joints 4c, it is necessary to connect the optoelectronic co-packaged module 100 to each of the action joints 4c, and, at the same time, the several optoelectronic co-packaged modules 100 are connected together by optical fibers, at which time, the several optoelectronic co-packaged modules 100 as well as the optical fibers form a structure similar to a blood vessel, and in order to achieve the application in the present field, the optoelectronic co-packaged module 100 can be constructed as follows.

The optoelectronic co-packaged module 100 comprises a frame integrated board 181 and a central integrated board 182, wherein the central integrated board 182 is snap-fitted in the frame integrated board 181, and the upstream signal conversion amplification module 112, the electrical signal replication module 113, the downstream signal conversion amplification module 122 and the electrical signal superposition module 123 are arranged on the back of the central integrated board 182, as well as the upstream optical signal receiver 111, the upstream optical signal transmitter 114, the downstream optical signal receiver 121 and the downstream optical signal transmitter 124 are arranged on the front of the frame integration board 181.

The optoelectronic co-packaged module 100 also comprises a first upstream optical port tube 141 and a second upstream optical port tube 142, wherein the first upstream optical port tube 141 and the second upstream optical port tube 142 are connected to the upper end and lower end of the optoelectronic co-packaged module 100, and optical fibers for transmitting the upstream optical signals S1 are set up in the first upstream optical port tube 141 and the second upstream optical port tube 142 respectively.

The optoelectronic co-packaged module 100 also comprises a first downstream optical port tube 151 and a second downstream optical port tube 152, wherein the first downstream optical port tube 151 and the second downstream optical port tube 152 are connected to the upper and lower ends of the optoelectronic co-packaged module 100, and optical fibers for transmitting the downstream optical signals S2 are set up in the first downstream optical port tube 151 and the second downstream optical port tube 152 respectively.

The first upstream optical port tube 141 and the first downstream optical port tube 151 are parallel to each other, and the second upstream optical port tube 142 and the second downstream optical port tube 152 are parallel to each other.

The first upstream optical port tube 141 is connected to the upstream optical signal receiver 111, and the second upstream optical port tube 142 is connected to the upstream optical signal transmitter 114, and the first downstream optical port tube 151 is connected to the downstream optical signal transmitter 124, and the second downstream optical port tube 152 is connected to the downstream optical signal receiver 121.

The frame integration board 181 has an assembly window 190, and the central integration board 182 is snapped in the assembly window 191.

The central integration board 182 is provided with several convex pins 183 convexly on the side wall, wherein the upstream signal conversion amplification module 112, the electrical signal superposition module 113, and the downstream signal conversion amplification module 122 and the electrical signal superposition module 123 are respectively connected to the convex pins 183, and corresponding to the several convex pins 183, several pin slots 184 are concavely provided on the inner wall of the assembly window 190, and the upstream optical signal receiver 111, the upstream optical signal transmitter 114, the downstream optical signal receiver 121 and the downstream optical signal transmitter 124 are respectively connected to the pin slots 184, and the several convex pins 183 are correspondingly inserted in the several pin slots 184 so as to achieve the snapped-in connection between the central integration board 182 and the frame integration board 181, and at the same time to achieve the snapped-in connection between the upstream optical signal receiver 111 and the upstream signal conversion amplification module 112, and so that the electrical signal superposition module 113 is connected to the upstream optical signal transmitter 114, and the downstream optical signal receiver 121 is connected to the downstream signal conversion amplification module 122, and the electrical signal superposition module 123 is connected to the downstream optical signal transmitter 124.

Several connection pins 185 are also provided at the back of the central integration board 182, wherein the connection pins 185 are connected to the electrical signal replication module 113 and the electrical signal superposition module 123 respectively, and the several connection pins 185 are plugged into the action joint 4c so as to achieve the fixed connection and the electrical connection between the optoelectronic co-packaged module 100 and the action joint 4c.

What is claimed is:

1. An optical transmission system to transmit signals by optoelectronic co-packaged modules, comprising a fiber optic transmission bus, several optoelectronic co-packaged modules, and several node terminals, wherein the optoelectronic co-packaged module corresponds to the node terminals one to one, and several signal transmission nodes are provided on the fiber optic transmission bus, and the optoelectronic co-packaged module is provided at the location of each of the signal transmission nodes, and the optoelectronic co-packaged module is connected to the node terminals, wherein a bus optical signal is transmitted in the fiber optic transmission bus, and the bus optical signal comprises an upstream optical signal and a downstream optical signal, wherein the upstream optical signal is signaled according to the following steps as the upstream optical signal passes through each of the signal transmission nodes:

step A1, transmitting the upstream optical signal into the optoelectronic co-packaged module, step B1, the optoelectronic co-packaged module converting the upstream optical signal into an upstream current signal, step C1, the optoelectronic co-packaged module converting the upstream current signal into a voltage signal and amplifying the voltage signal to obtain an internal upstream voltage signal, step D1, the optoelectronic co-packaged module replicating the internal upstream voltage signal to obtain a transmission voltage signal and a replication voltage signal, wherein the information of the transmission voltage signal and the replication voltage signal are the same as the information of the upstream optical signal, step E1, transmitting the replication voltage signal into the node terminal, and the optoelectronic co-packaged module converting the transmission voltage signal into an upstream output current signal, step F1, the optoelectronic co-packaged module converting the upstream output current signal into the upstream optical signal, step G1, the optoelectronic co-packaged module transmitting the upstream optical signal into the fiber optic transmission bus so that the upstream optical signal continues to be transmitted forward along the fiber optic transmission bus, wherein the downstream optical signal passes through each of the signal transmission nodes in accordance with the following steps of signal transmission:

step A2, transmitting the downstream optical signal to the optoelectronic co-packaged module, step B2, the optoelectronic co-packaged module converting the downstream optical signal into a downstream current signal, step C2, the optoelectronic co-packaged module converting the downstream current signal into a voltage signal and amplifies the voltage signal to obtain a downstream voltage signal, step D2, transmitting the feedback voltage signal generated from the feedback information of the node terminal to the optoelectronic co-packaged module, and the optoelectronic co-packaged module superposing the downstream voltage signal with the feedback voltage signal to form the superposed voltage signal, step E2: the optoelectronic co-packaged module converting the superposed voltage signal into a downstream output current signal, step F2, the optoelectronic co-packaged module converting the downstream output current signal into a superposed downstream optical signal, wherein the information of the superposed downstream optical signal comprises the information of the downstream optical signal and the feedback information of the node terminal, step G2, the optoelectronic co-packaged module transmitting the superposed downstream optical signal into the fiber optic transmission bus, step H2, transmitting the superposed downstream optical signal used as the downstream optical signal of another optoelectronic co-packaged module into another optoelectronic co-packaged module, and repeating the step A2.

2. The optical transmission system to transmit signals by optoelectronic co-packaged modules, as recited in claim 1, wherein the optoelectronic co-packaged module comprises an upstream signal processing portion and a downstream signal processing portion, wherein in the optoelectronic co-packaged module, the upstream optical signal is transmitted by the upstream signal processing portion, and in the optoelectronic co-packaged module, the downstream optical signal is transmitted by the downstream signal processing portion, wherein the upstream signal processing portion comprises an upstream optical signal receiver, an upstream signal conversion amplification module, an electrical signal replication module, and an upstream optical signal transmitter, wherein in the step B1, the upstream optical signal is converted into the upstream current signal by the upstream optical signal receiver, wherein in the step C1, the upstream signal conversion amplification module converts the upstream current signal into a voltage signal and amplifies the voltage signal to obtain the internal upstream voltage signal, wherein the step D1, the electrical signal replication module replicates the internal upstream voltage signal to obtain the transmission voltage signal and the replicated voltage signal, wherein in the step E1, the electrical signal replication module transmits the replicated voltage signal to the node terminal, and the electrical signal replication module converts the transmission voltage signal into the upstream output current signal, wherein in the step F1, the upstream optical signal transmitter converts the upstream output current signal into the upstream optical signal, wherein the downstream signal processing portion comprises a downstream optical signal receiver, a downstream signal conversion amplification module, an electrical signal superposition module and a downstream optical signal transmitter, wherein in the step B2, the downstream optical signal is converted into the downstream current signal by the downstream optical signal receiver, wherein in the step C2, the downstream current signal is converted into a voltage signal by the downstream signal conversion amplification module, and the voltage signal is amplified to obtain the downstream voltage signal, wherein in the step D2, the feedback voltage signal is transmitted to the electrical signal superposition module, and the electrical signal superposition module superposes the downstream voltage signal with the feedback voltage signal to form the superposed voltage signal, wherein in the step E2, the electrical signal superposition module converts the superposed voltage signal into the downstream output current signal, wherein in the step F2, the downstream optical signal transmitter converts the downstream output current signal into the superposed downstream optical signal.

3. The optical transmission system to transmit signals by optoelectronic co-packaged modules, as recited in claim 2, wherein the upstream current signal is between 0.1 mA and 1.2 mA, and the internal upstream voltage signal is between 200 and 800 mV, and the transmission voltage signal as well as the replica voltage signal are between 100 and 400 mV, and the upstream output current signal is between 5 and 20 mA, wherein the downstream current signal is between 0.1 mA and 1.2 mA, that downstream voltage signal is between 100 and 400 mV, that feedback voltage signal is between 100 and 400 mV, that superposed voltage signal is between 200 and 800 mV, and that downstream output current signal is between 5 and 20 mA, wherein the electrical signal replication module is provided with a Y-type silicon base having a voltage input terminal, a first voltage output terminal, and a second voltage output terminal, wherein the internal upstream voltage signal is input into the Y-type silicon base from the voltage input terminal, and the transmission voltage signal is output from the first voltage output terminal, and the electrical signal replication module converts the transmission voltage signal into the upstream output current signal, and the replicated voltage signal is output from the second voltage output terminal and transmitted to the node terminal, wherein the electrical signal superposition module is provided with a Y-type silicon base, which has a voltage output terminal, a first voltage input terminal, and a second voltage input terminal, wherein the downstream voltage signal is input into the Y-type silicon base from the first voltage input terminal, and the feedback voltage signal is input into the Y-type silicon base from the second voltage input terminal, and the superposed voltage signal is output from the first voltage input terminal, wherein in the Y-type silicon base, the downstream voltage signal is superposed with the feedback voltage signal to form the superposed voltage signal, and the superposed voltage signal is output from the voltage output terminal.

4. The optical transmission system to transmit signals by optoelectronic co-packaged modules, as recited in claim 2, wherein the distributed and low-latency optoelectronic co-packaged module further comprises an upstream comparative error corrector, wherein the upstream comparison error corrector is connected to an upstream signal transmission section, wherein the upstream signal transmission section is provided with several of the optoelectronic co-packaged modules, wherein the upstream comparison error corrector comprises an upstream voltage acquisition module, an upstream storage module, and an upstream voltage comparison module, wherein the upstream voltage acquisition module is connected to the upstream signal conversion amplification modules of the front-most and the rear-most optoelectronic co-packaged module in the upstream signal transmission section respectively, wherein the upstream voltage acquisition module acquires the internal upstream voltage signal generated in the upstream signal conversion amplification module in the front-most optoelectronic co-packaged module and forms the upstream standard voltage signal, and in synchronization, the upstream voltage acquisition module acquires the internal upstream voltage signal generated in the upstream signal conversion amplification module in the rearmost optoelectronic co-packaged module and forms an upstream ratio signal and forms an upstream comparison voltage signal, wherein the upstream voltage acquisition module transmits the upstream standard voltage signal to the upstream storage module for storage, and at the same time, the upstream voltage acquisition module transmits the upstream standard voltage signal and the upstream comparison voltage signal to the upstream voltage comparison module for comparison, wherein when the upstream standard voltage signal is equal to the upstream comparison voltage signal, the upstream comparison error corrector does not operate, and when the upstream standard voltage signal is not equal to the upstream comparison voltage signal, the upstream storage module transmits the upstream standard voltage signal to the upstream signal conversion amplification module of the last-end optoelectronic co-packaged module, and the upstream standard voltage signal generates the internal upstream voltage signal of the last end optoelectronic co-packaged module and continues to be transmitted backward.

5. The optical transmission system to transmit signals by optoelectronic co-packaged modules, as recited in claim 2, wherein the distributed and low-latency optoelectronic co-packaged module comprises a downstream comparison error corrector, wherein the downstream comparison error corrector is connected to a downstream signal transmission section, and the several optoelectronic co-packaged modules are provided in the downstream signal transmission section, wherein the downstream comparison error corrector comprises a downstream voltage acquisition module, a downstream storage module and a downstream voltage comparison module, wherein the downstream voltage acquisition module is connected to the downstream signal conversion amplification module in each of the optoelectronic co-packaged modules in the downstream signal transmission section, wherein the downstream voltage acquisition module acquires the downstream voltage signal generated in the downstream signal conversion amplification module in the foremost optoelectronic co-packaged module in the downstream signal transmission section and forms the downstream contrast voltage signal, and in synchronization, the downstream voltage acquisition module acquires the downstream voltage signals generated in the downstream signal conversion amplification module in the rest of the optoelectronic co-packaged modules in the downstream signal transmission section, and superpose several downstream voltage signals and form a downstream standard voltage signal, wherein the downstream voltage acquisition module transmits the downstream standard voltage signal to the downstream storage module for storage, and at the same time, the downstream voltage acquisition module transmits the downstream standard voltage signal and the downstream comparison voltage signal to the downstream voltage comparison module for comparison, wherein when the downstream standard voltage signal is equal to the downstream comparison voltage signal, the downstream comparison error corrector does not operate, and when the downstream standard voltage signal is not equal to the downstream comparison voltage signal, the downstream storage module transmits the downstream standard voltage signal to the downstream signal conversion amplification module of the foremost optoelectronic co-packaged module, and the standard voltage signal generates a downstream voltage signal of the foremost optoelectronic co-packaged module and continues to be transmitted forward.

6. The optical transmission system to transmit signals by optoelectronic co-packaged modules, as recited in claim 5, wherein the several optoelectronic co-packaged modules in the downstream signal transmission section is no more than five.

7. The optical transmission system to transmit signals by optoelectronic co-packaged modules, as recited in claim 2, wherein the optoelectronic co-packaged module comprises an upper integrated board and a lower integrated board, wherein the upper integrated board is connected to the top of the lower integrated board, and the upper integrated board and the lower integrated board are parallel to each other, wherein the upstream signal conversion amplification module, the electrical signal copying module, the downstream signal conversion amplification module and the electrical signal superposition module are arranged on the upper integrated board, and the upstream optical signal receiver, the upstream optical signal transmitter, the downstream optical signal receiver and the downstream optical signal transmitter are arranged on the lower integration board, wherein the optoelectronic co-packaged module further comprises a first upstream optical port tube, a second upstream optical port tube, a first downstream optical port tube and a second downstream optical port tube, wherein the first upstream optical port tube, the second upstream optical port tube, the first downstream optical port tube and the second downstream optical port tube are arranged at the bottom of the lower integrated board, wherein the first upstream optical port tube, the second upstream optical port tube, the first downstream optical port tube and the second downstream optical port tube are arranged in parallel with each other, wherein optical fibers for transmitting the upstream optical signal are arranged in the first upstream optical port tube and the second upstream optical port tube respectively, and optical fibers for transmitting the downstream optical signal are arranged in the first downstream optical port tube and the second downstream optical port tube respectively, wherein the first upstream optical port tube is connected to the upstream optical signal receiver, and the second upstream optical port tube is connected to the upstream optical signal transmitter, and the first downstream optical port tube is connected to the downstream optical signal transmitter, and the second downstream optical port tube is connected to the downstream optical signal receiver.

8. The optical transmission system for transmitting signals through an optoelectronic co-packaged module, as recited in claim 7, wherein the upper integrated board is provided with a male engaging plate below, and the lower integrated board is provided with the female engaging plate corresponding to the male engaging plate, wherein the male engaging plate is provided with several male pins in parallel, and several female pin holes is provided with the female engaging plate corresponding to the several male pins, wherein the several male pins are correspondingly inserted in the several female pin holes so as to achieve the connection between the upper integrated board and the lower integrated board, to achieve the connection between the upstream optical signal receiver and the upstream signal converter-amplifier module, to achieve the connection between the electrical signal superposition module and the upstream optical signal transmitter, to achieve the connection between the downstream optical signal receiver and the downstream signal converter-amplifier module of the downstream optical signal receiver, and to achieve the connection between the electrical signal superposition module and the downstream optical signal transmitter, wherein the upper integrated board is also provided with several module pins at the back thereof, wherein the several module pins are connected to the electrical signal replication module and the electrical signal superposition module respectively, and the several module pins are plugged into the node terminal to achieve the fixed connection and electrical connection between the optoelectronic co-packaged module and the node terminal.

9. The optical transmission system to transmit signals by optoelectronic co-packaged modules, as recited in claim 2, wherein the optoelectronic co-packaged module comprises a frame integrated board and a central integrated board, wherein the central integrated board is snap-fitted in the frame integrated board, wherein the upstream signal conversion amplification module, the electrical signal replication module, the downstream signal conversion amplification module and the electrical signal superposition module are arranged on the back of the central integrated board, as well as the upstream optical signal receiver, the upstream optical signal transmitter, the downstream optical signal receiver and the downstream optical signal transmitter are arranged on the front of the frame integration board, wherein the optoelectronic co-packaged module also comprises a first upstream optical port tube and a second upstream optical port tube, wherein the first upstream optical port tube and the second upstream optical port tube are connected to the upper end and lower end of the optoelectronic co-packaged module, and optical fibers for transmitting the upstream optical signals are set up in the first upstream optical port tube and the second upstream optical port tube respectively, wherein the optoelectronic co-packaged module also comprises a first downstream optical port tube and a second downstream optical port tube, wherein the first downstream optical port tube and the second downstream optical port tube are connected to the upper and lower ends of the optoelectronic co-packaged module, and optical fibers for transmitting the downstream optical signals are set up in the first downstream optical port tube and the second downstream optical port tube respectively, wherein the first upstream optical port tube and the first downstream optical port tube are parallel to each other, and the second upstream optical port tube and the second downstream optical port tube are parallel to each other, wherein the first upstream optical port tube is connected to the upstream optical signal receiver, and the second upstream optical port tube is connected to the upstream optical signal transmitter, and the first downstream optical port tube is connected to the downstream optical signal transmitter, and the second downstream optical port tube is connected to the downstream optical signal receiver, wherein the frame integration board has an assembly window, and the central integration board is snapped in the assembly window.

10. The optical transmission system for transmitting signals by means of optoelectronic co-packaged modules, as recited in claim 9, wherein the central integration board is provided with several convex pins convexly on the side wall, wherein the upstream signal conversion amplification module, the electrical signal superposition module, and the downstream signal conversion amplification module and the electrical signal superposition module are respectively connected to the convex pins, and corresponding to the several convex pins, several pin slots are concavely provided on the inner wall of the assembly window, wherein the upstream optical signal receiver, the upstream optical signal transmitter, the downstream optical signal receiver and the downstream optical signal transmitter are respectively connected to the pin slots, and the several convex pins are correspondingly inserted in the several pin slots so as to achieve the snapped-in connection between the central integration board and the frame integration board, and at the same time to achieve the snapped-in connection between the upstream optical signal receiver and the upstream signal conversion amplification module, and so that the electrical signal superposition module is connected to the upstream optical signal transmitter, and the downstream optical signal receiver is connected to the downstream signal conversion amplification module, and the electrical signal superposition module is connected to the downstream optical signal transmitter, wherein several connection pins are also provided at the back of the central integration board, wherein the connection pins are connected to the electrical signal replication module and the electrical signal superposition module respectively.

* * * * *